(12) United States Patent
Fischer

(10) Patent No.: US 6,332,657 B1
(45) Date of Patent: Dec. 25, 2001

(54) SET OF CONSTRUCTION ELEMENTS FOR FURNITURE

(75) Inventor: Lukas Fischer, Zuerich (CH)

(73) Assignee: Lukas Fischer Chamaeleon Design, Zurich (CH)

(*) Notice: Subject to any disclaimer, the term of this patent is extended or adjusted under 35 U.S.C. 154(b) by 0 days.

(21) Appl. No.: 09/462,370
(22) PCT Filed: Jul. 6, 1998
(86) PCT No.: PCT/CH98/00295
  § 371 Date: Apr. 4, 2000
  § 102(e) Date: Apr. 4, 2000
(87) PCT Pub. No.: WO99/02071
  PCT Pub. Date: Jan. 21, 1999

(30) Foreign Application Priority Data

Jul. 7, 1997 (CH) .................................................. 1652/97

(51) Int. Cl.[7] .................................................. A47B 47/00
(52) U.S. Cl. .............................. 312/111; 403/217; 49/413; 312/257.1
(58) Field of Search .................................. 312/107, 108, 312/111, 140, 257.1, 263, 351; 403/187, 188, 217, 218, 219, 382, 403; 52/656.9, 655.1; 49/413

(56) References Cited

U.S. PATENT DOCUMENTS 3,288,319 * 11/1966 Cahill .............................. 312/111 X
3,346,310   10/1967 Diack .
3,485,519 * 12/1969 Chiu .................................. 403/187 X
3,736,035    5/1973 Brown et al. .
5,378,077 *  1/1995 Paulsen ............................ 403/403 X
5,820,289 * 10/1998 Kern et al. ........................ 403/217 X

FOREIGN PATENT DOCUMENTS 296 01 648 U1   5/1996 (DE) .
81374           8/1963 (FR) .
1451114         8/1966 (FR) .
2 677 084      12/1992 (FR) .

* cited by examiner

Primary Examiner—Peter M. Cuomo
Assistant Examiner—Michael J. Fisher
(74) Attorney, Agent, or Firm—Crowell & Moring LLP

(57) ABSTRACT

To assemble pieces of furniture, for example shelves, hollow supporting shapes (1, 2, 3) having a rectangular cross-section are connected by means of Lshaped angle braces (4) and tenons (5) which can be inserted into the ends of the shapes so as to form frames (19, 21), and assembled into cubic pieces of furniture using said shapes (3) as upright posts. According to the invention, frame shapes (23) having four chambers are preferably also used, which can save as the resting edges for shelves (22). These frame shapes (23) have a slot (36, 37, 38, 39) for each chamber, in which slots sliding door elements (33, 34) of different thicknesses can be held by means of an elastic shape (35) in such a way that the doors can easily be displaced. Said elastic shapes (35) preferably comprise grooves (36, 37, 38, 39) of different thicknesses for receiving the sliding door elements (33, 34).

33 Claims, 7 Drawing Sheets

SET OF CONSTRUCTION ELEMENTS FOR FURNITURE

BACKGROUND AND SUMMARY OF THE INVENTION

This application claims the priority of Swiss application 1652/97, filed in Switzerland on Jul. 7, 1997, and International Application PCT/CH98/00295 filed on Jul. 6, 1998, the disclosures of which are expressly incorporated by reference herein.

The present invention relates to a set of structural elements for furniture which contains connection elements, supporting profiles and covers.

Furniture systems are known which permit the construction of, for example, shelves of corner joints, supporting profiles and cover plates. For example, rods with round cross-sections and of different lengths are used as supporting profiles which can be used to build cubical shapes and which are connected with one another on the corners in each case by means of corner joints which have threaded rods as connection elements. A basic frame constructed in this manner is then equipped with cover plates which are used as plates, coverings, housing parts or doors. By means of a few basic elements, these structural elements permit the production of multiple pieces of furniture, particularly shelves, of different sizes which can be adapted to the individual requirements.

However, because of the construction with closed profiles, restrictions exist with respect to the further development of the cover elements, particularly of the door elements. Thus, hinged doors and folding doors can be implemented only by the installation of special fittings. These fittings, which are mounted in the useful range of the corresponding shelve space, restrict the freely usable space. It is also difficult for a layperson to handle the basic building of such shelves because the corner connections are very complex and special tools are required for establishing reliable connections.

It is an object of the present invention to find structural elements for furniture in order to create furniture which can be assembled and disassembled in a simple manner, such as shelves, and which can also be equipped with cover elements in a simple manner.

According to the invention, this object is achieved by means of structural elements wherein the supporting profiles are straight rod-type hollow profiles which have a rectangular cross-section, wherein corner connections are L-shaped angular fittings which can be inserted into the supporting profiles and which have an essentially rectangular cross-section and have indentations which extend on at least two opposite sides respectively transversely to the insertion direction and are arranged in parallel to one another and can be connected in the corner area perpendicularly to the insertion direction with rectangular studs which also have a rectangular cross-section and indentations which extend on at least two opposite sides respectively transversely to the insertion direction and are arranged in parallel to one another and can also be inserted into the supporting profiles.

Further advantageous features of the invention are described herein and in the claims.

The combination of supporting profiles having a rectangular cross-section with the L-shaped corner connections permits the simple production of frame elements which are dimensionally stable. Starting on the corners, additional supporting profiles can be mounted on these frame elements by means of the assembling studs, which are used as vertical posts of the pieces of furniture or shelves. As the result of the simple construction of the elements, the assembly can also be carried out by untrained persons without any special tools. Conventional screwed connections can advantageously be used.

Particularly for the horizontal boards, frame profiles further developed according to the invention are preferably provided, into which flat cover plates can advantageously be inserted as sliding elements. For this purpose, the preferably further developed special profiles are provided which have an H-shaped cross-section and which are longitudinally displaceably arranged in the frame profiles and receive the cover plates. As the result of the preferred shaping of the profiles according to the invention, boards of virtually any thickness having a single profile shape can be used. This, in particular, permits the selection of different materials for the coverings, such as wood, plastic, glass, and the like, and particularly also the change of these materials and thus of the wall thicknesses of the assembled pieces of furniture. As the result of the arrangement as a double groove, adjacent boards can be displaced with respect to one another unhindered. This arrangement also has the advantage that no space is required for a door mounting or the like, whereby the useful space is not impaired by the covering.

Other objects, advantages and novel features of the present invention will become apparent from the following detailed description of the invention when considered in conjunction with the accompanying drawings.

DETAILED DESCRIPTION OF THE DRAWINGS

Figure 1:
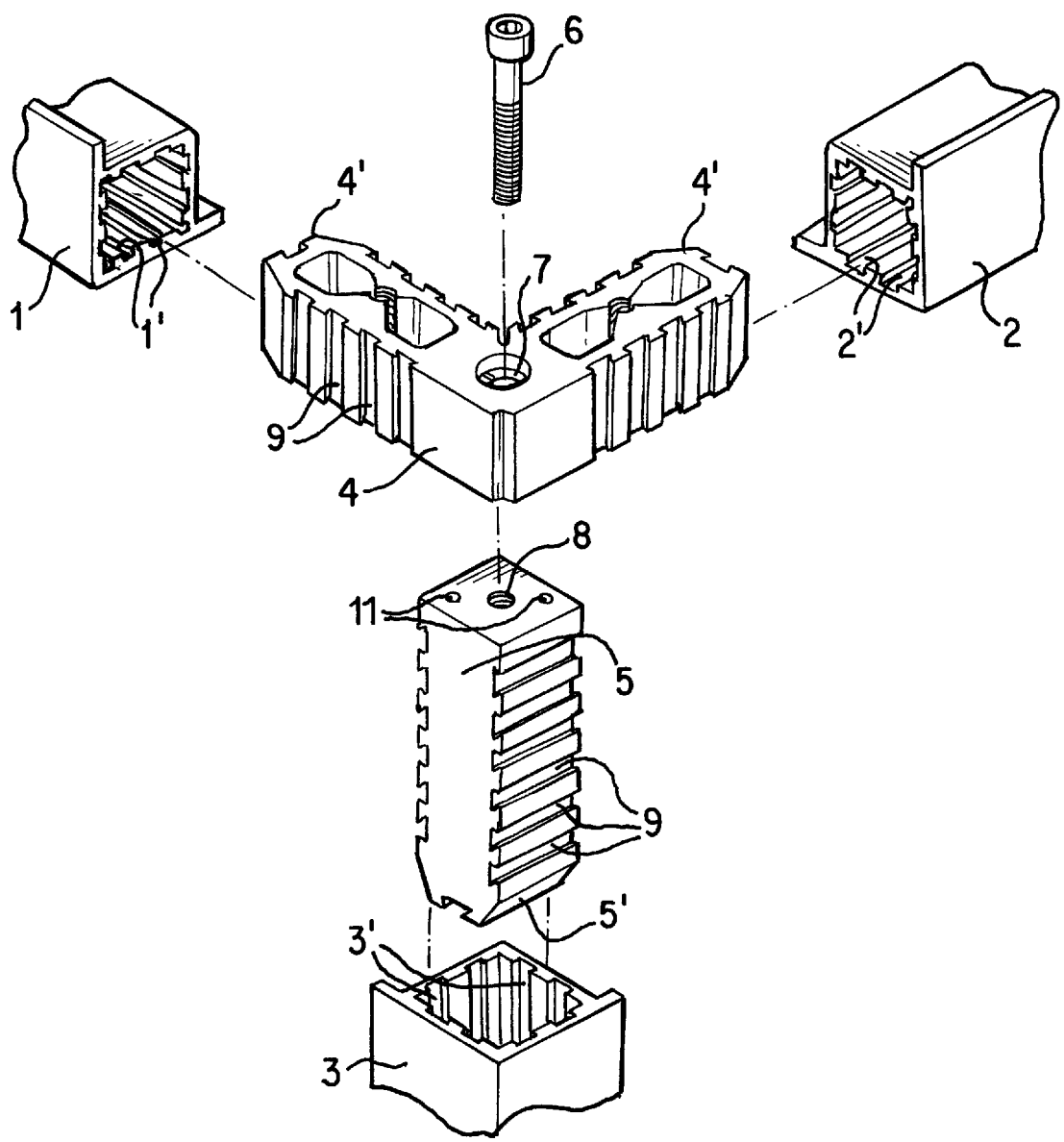
FIG. 1 is a view of connection elements and supporting profiles according to the invention.

In order to form the supporting structure for a piece of furniture, such as shelves, hollow supporting profiles 1, 2, 3 are used according to the invention which have a rectangular cross-section and are illustrated in FIG. 1. These supporting profiles 1, 2, 3 preferably have vertically cut-off ends and have preferably longitudinally extending grooves 1', 2', 3' on the interior surfaces. For the assembly of the supporting structure, advantageously, a flat rectangular frame is created first from four supporting profiles 1, 2, which are connected on their corners by means of angular fittings 4 which can be fitted into the openings of the supporting profiles 1, 2. This frame is used as the horizontal element of the supporting structure. Additional supporting profiles 3 are used as vertical elements which are connected with the angular fittings 4 by way of studs 5. The connection may take place, for example, by means of screws 6 which are guided through a bore 7 in the angular fitting 4 and can be screwed into a thread 8 in the stud 5.

The ends of the angular fitting 4 as well as of the stud 5, which can be slid into the supporting profiles 1, 2, 3, advantageously have an identical design and have a trapezoidal tip 4' and 5'. Furthermore, indentations 9 exist according to the invention which, on two opposite sides of the angular fitting 4 and advantageously also of the stud 5, extend transversely to the insertion direction and are arranged in parallel to one another. These indentations 9 may be simple channels or grooves in a dovetail shape.

Figure 2:
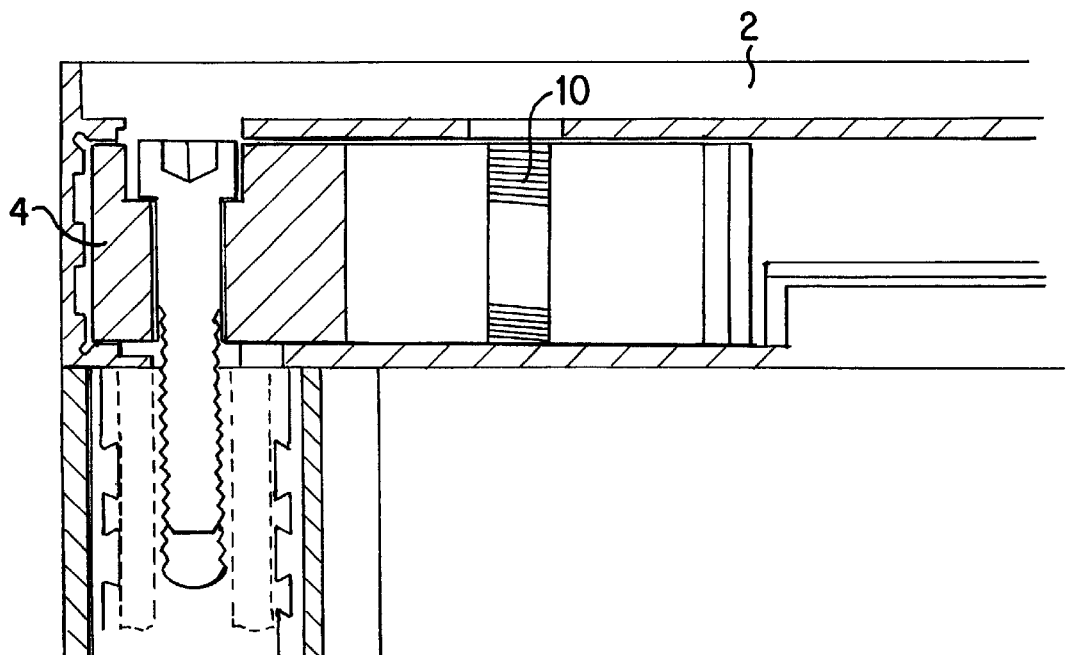
FIG. 2 is a sectional view of a corner area with installed connection elements and supporting profiles according to FIG. 1.

The angular fitting 4 is connected, for example, by means of a screw 10, with the respective supporting profile 2, as illustrated in the longitudinal sectional view of FIG. 2.

However, as the result of the indentations 9 and the grooves 2', the connection can advantageously also take place by gluing, which results in a particularly stable connection.

So that the studs 5 do not rotate during the fastening with the angular fitting 4, positioning devices can preferably be provided on the stud 5 in the form of pins 11 which engage in corresponding bores in the angular fitting 4, as illustrated in FIG. 1.

Figure 3:
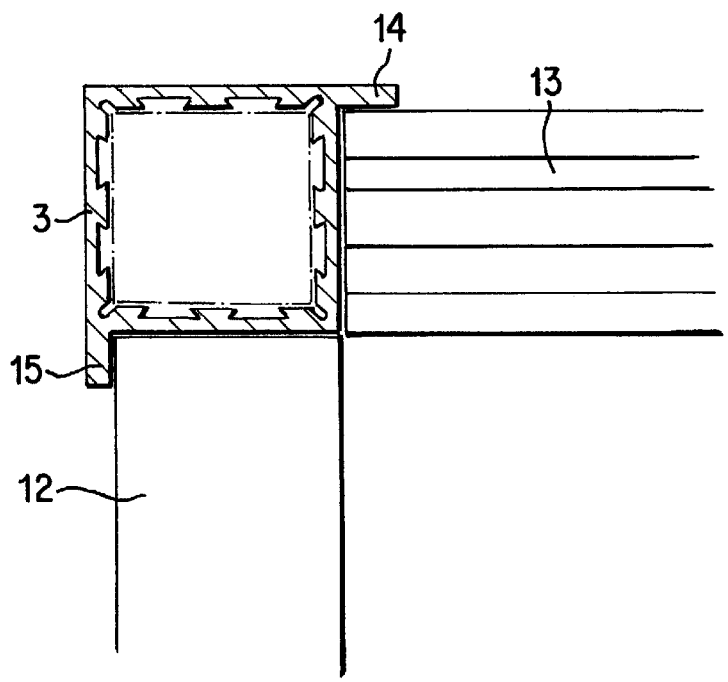
FIG. 3 is a cross-sectional view of a post.

FIG. 3 is a cross-sectional view of a post supporting profile 3, which is contacted laterally, for example, by cover plates 12 or eye catchers 13. The cross-sectional shape of the supporting profile 3 is particularly clearly visible here, which supporting profile 3 has a rectangular, preferably square basic shape and has cheeks 14, 15 constructed on two mutually opposite sides as a continuation of the side wall. As illustrated here, these permit, for example, a simple fastening of cover plates 12, eye catchers 13 or board elements (not shown).

Figure 4:
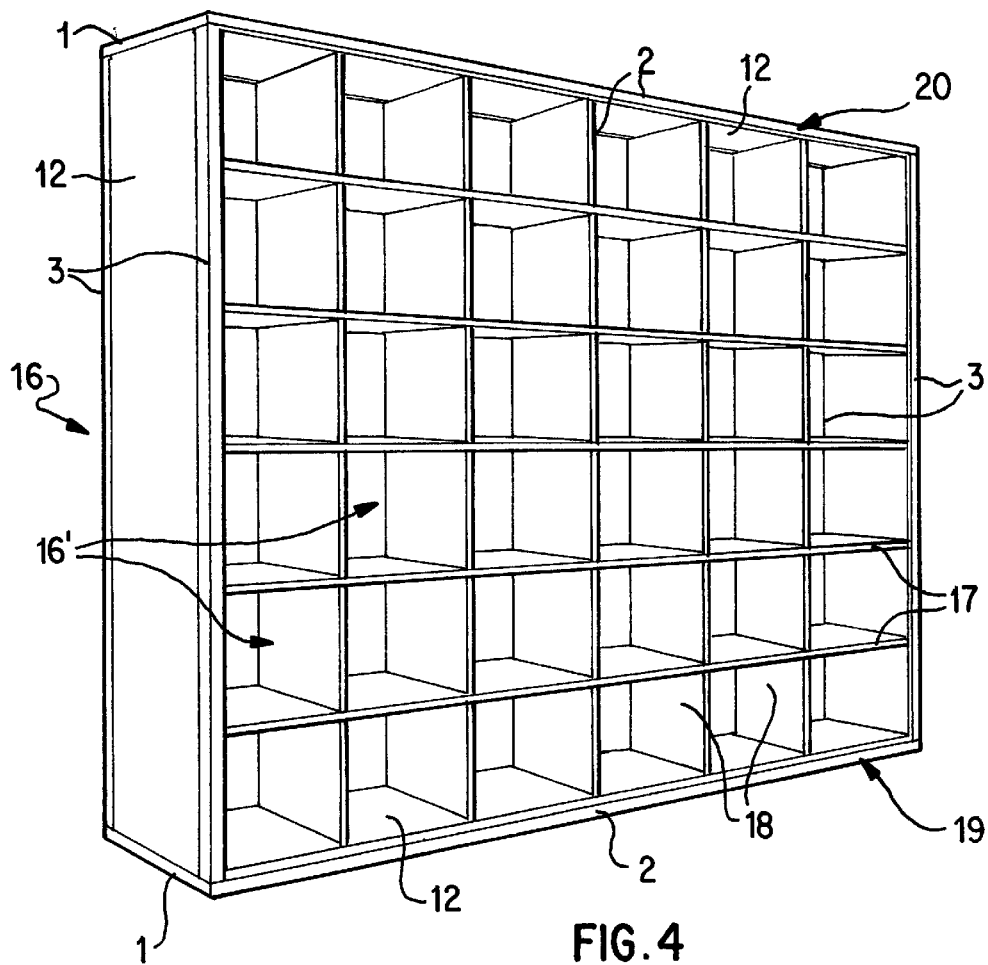
FIG. 4 is a view of shelves constructed of the elements of FIG. 1.

FIG. 4 is a view of a box-type rack 16 which is constructed of the set of structural elements according to the invention. Here, a bottom frame 19 and an upper end frame 20 were constructed of supporting profiles 1, 2 which were supplemented to form a box by means of post supporting profiles 3. This box was now supplemented by board elements 17 and partitions 18 to result in a rack 16 which has a plurality of compartments 161. Cover plates 12, which are mounted on the side, on the top and on the bottom, complete the rack 16.

Figure 5:
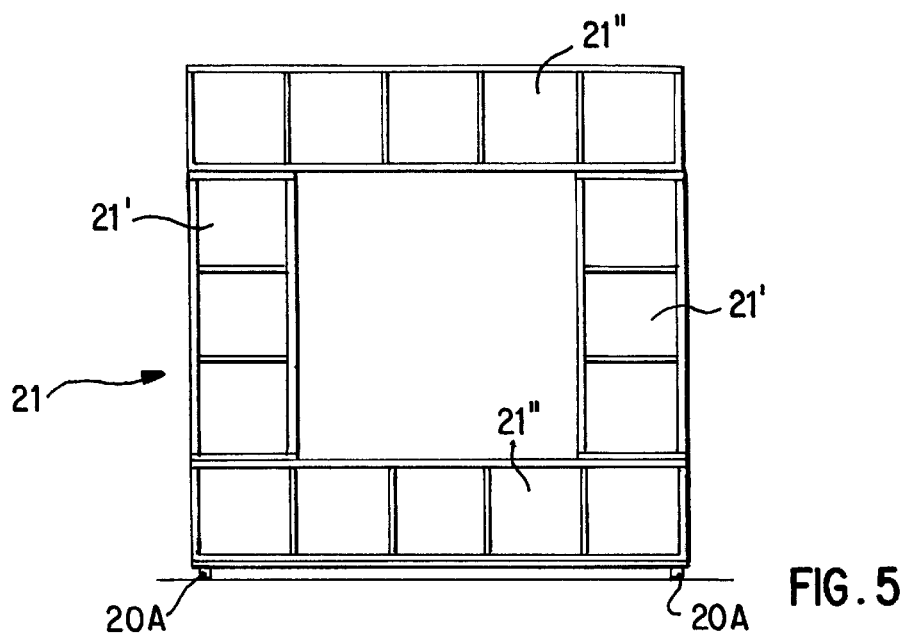
FIG. 5 is a view of other shelves constructed of the element FIG. 1.

FIG. 5 illustrates another possibility of constructing a rack 21 provided with rollers 20A, which is constructed of individual modules 21', 21", each module 21', 21" basically having the same construction as the rack 16 illustrated in FIG. 4. Because of the modularity of the elements, virtually any cubical shapes of furniture can be implemented in a simple manner.

In this case, it is particularly advantageous that, by means of a single profile 1, 2, 3 and a single two-piece corner fitting consisting of the angular fitting 4 and the stud 5, the basic constructions of such pieces of furniture can be built in a simple and rapid manner. The supporting profiles 1, 2, 3 can be made either in defined lengths or can in each case be cut to shape or cut off individually from long blanks. Because of the small number of elements, this advantageously leads to low stock-keeping costs.

Figure 6:
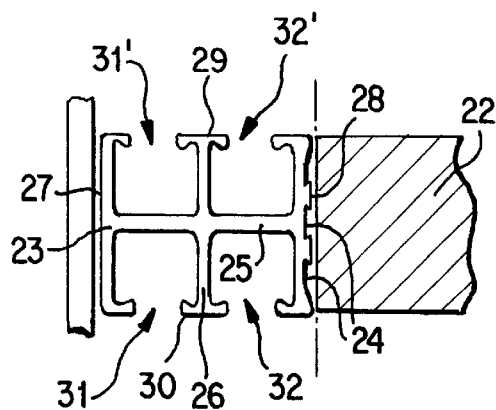
FIG. 6 is a longitudinal sectional view of a frame profile according to the invention.
Figure 7:
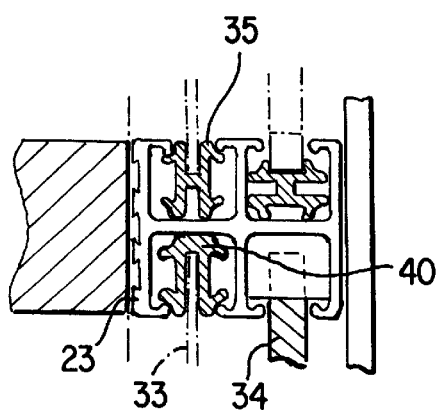
FIG. 7 is another longitudinal sectional view of a frame profile according to the invention.
Figure 9:
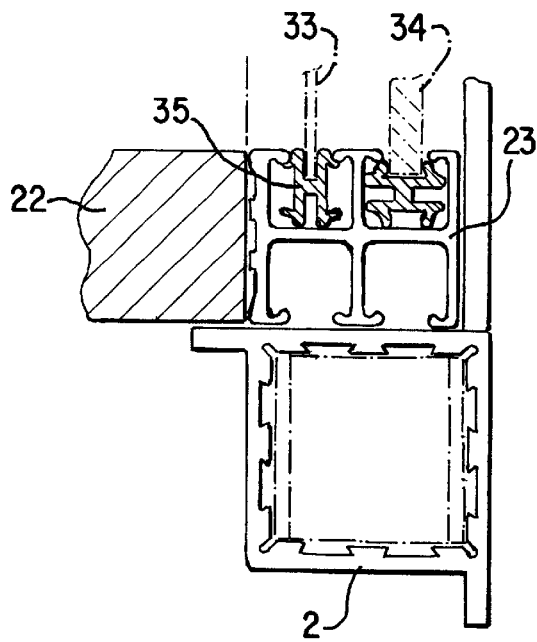
FIG. 9 is a longitudinal sectional view of another frame profile as according to FIG. 6 in the bottom area of a piece of furniture.

FIGS. 6, 7 and 9 are cross-sectional views of board elements 17. The actual board 22 is provided on its edge with a frame profile 23 which serves as an end edge. The frame profile 23 can advantageously be glued to the edge of the board 22. For this purpose, grooves 24 are preferably provided which extend longitudinally on a side wall of the frame profile 23 and which promote the gluing-together.

The frame profile 23 has two webs 25, 26, which cross one another in the center axis, as well as two closed side walls 27, 28, which are situated opposite one another, as well as two mutually opposite side walls 29, 30 with two longitudinally extending slots 31, 32; 31', 32' respectively which are arranged in parallel to one another, as illustrated in FIG. 6. As the result of this shaping, four identically large chambers are formed. On the edge of the side walls 29 and 30 with respect to the chambers, or with respect to the slots 31, 32; 31', 32', the wall thickness of the frame profile 23 is preferably enlarged in the manner of a bead toward the inside. In particular, a reinforcing of the edge of the slots 31, 32; 31', 32' is achieved in this manner.

Through these slots 31, 32; 31', 32', advantageously flat cover elements, for example, sliding doors 33, 34, can now be introduced and can be displaceably held therein, as illustrated in FIG. 7. In order to achieve a reliable displaceability, preferably special elastic profiles 35 are used for this purpose, which, on the one hand, can be longitudinally slidably inserted in the chambers of the frame profile 23 and, on the other hand, can receive and hold the edges of the sliding doors 33, 34

Figure 8:
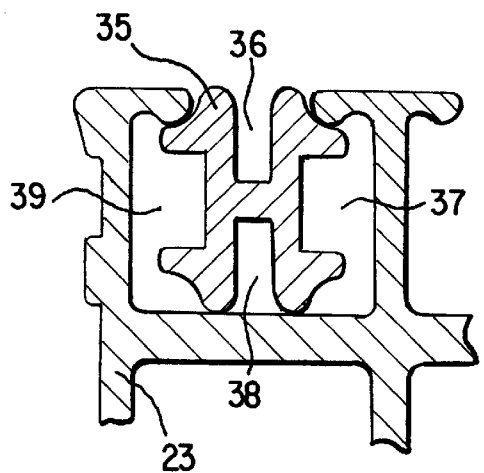
FIG. 8 is a cross-sectional view of the profile for receiving sliding elements, such as sliding doors.

For this purpose, these profiles 35 have an essentially H-shaped cross-section while forming grooves 36, 37, 38, 39 which are preferably situated opposite one another and have different widths, as illustrated in a cross-sectional view in FIG. 8. Because of the grooves 36, 37, 38 39, which have different widths, by means of a single profile shape, sliding doors 33, 34 can reliably be held which have very small to very large thicknesses. For this purpose, the profile 35 is inserted into the corresponding chamber of the frame profile 23 while being rotated such that the groove 36, 37, 38, 39 matching the thickness of the sliding door to be received points to the slot 31, 32; 31', 32' of the frame profile 23. As the result of the illustrated shaping, it is also advantageously achieved that the profile 35 is laterally reliably guided either by the fact that the corresponding profile shoulders rest against the slot edges of the slots 31, 32, 31', 32' or by resting against the interior walls of the chamber.

FIG. 9 illustrates, as an example, the holding of the lower edges of two sliding doors 33, 34 of different thicknesses. Here, the frame profile 23 itself rests by means of its bottom side on a supporting profile 2. The corresponding upper edges of the two sliding doors 33, 34 can now be guided in the lower chambers of another frame profile 23, which is mounted, for example, on the closest, higher-positioned board 22, as illustrated in FIG. 7. In this case, depending on the thickness of the sliding doors 33, 34, these can be guided either by means of another guiding profile 40 or without any profile. This profile may have a construction which is identical with the construction of the profile 35, or, as illustrated, may have fewer grooves or may have only a single groove.

Figure 10:
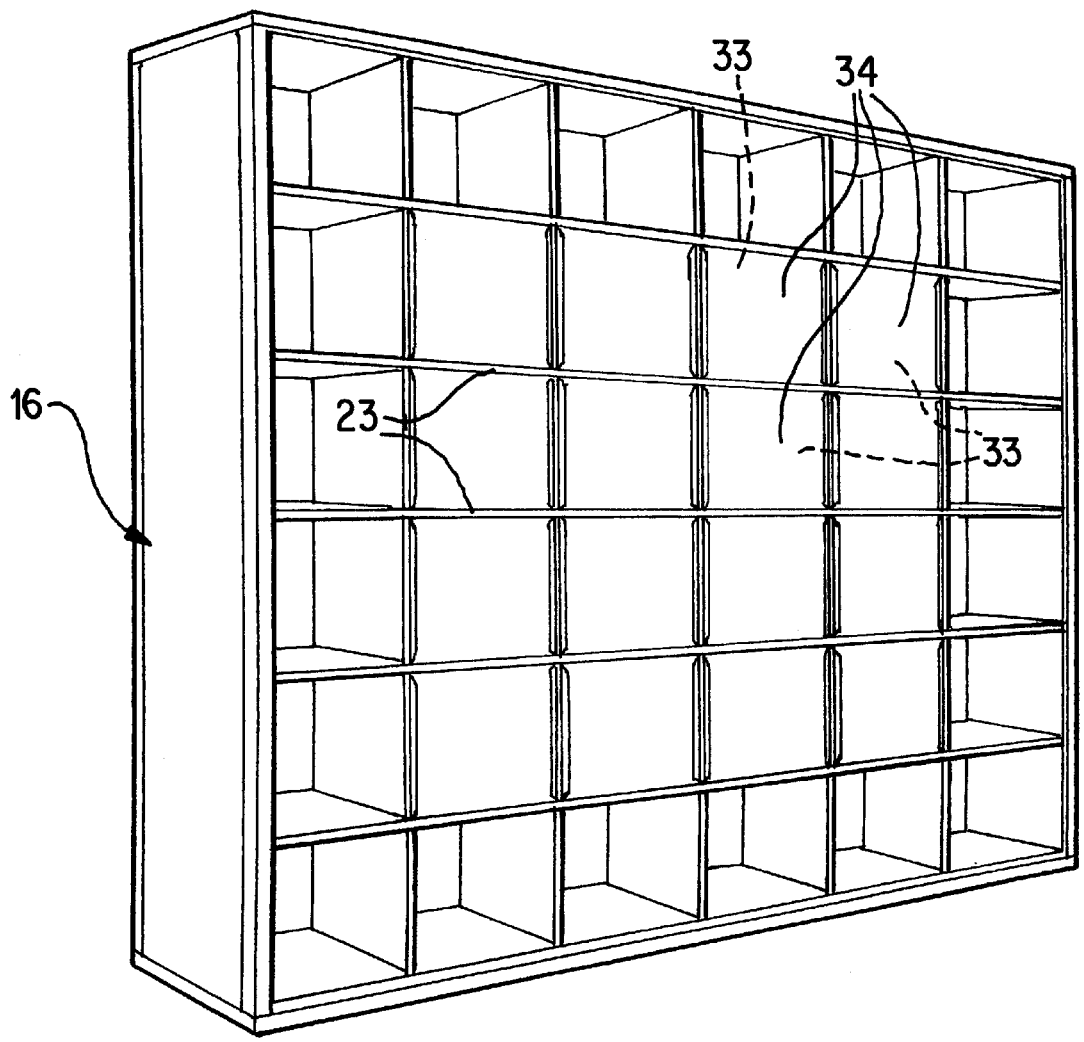
FIG. 10 is a view of shelves constructed according to the invention and having sliding doors.

In FIG. 10, the rack 16 illustrated in FIG. 4 is equipped with the above-described frame profiles 23 and sliding doors 33, 34, as shown in FIG. 10. Therefore, by means of the structural elements according to the invention, not only open pieces of furniture, such as open shelves, can be produced but also closed areas with doors, in which case no compartment is reduced because of projecting fittings.

Figure 11:
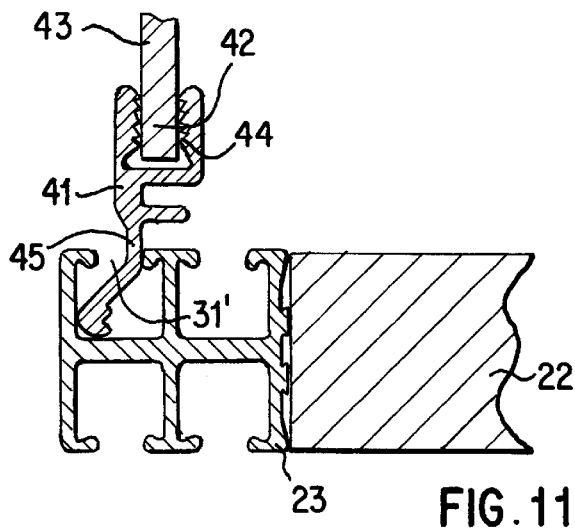
FIG. 11 is a cross-sectional view of a frame profile having a hinged profile according to the invention.

FIG. 11 is a cross-sectional view of a frame profile 23 with the board 22, into which a hinge profile 41 according to the invention is inserted. This hinge profile 41 has a basic body with a U-shaped groove 42, into which a plate 43 can be inserted as a covering. For this purpose, tooth-shaped ribs 44 are constructed on the interior side of the groove 42. A band 45, which first extends in a straight line, is then bent and has a semicircular rounding at its end, is formed on the basic body. The bending angle is selected such that, in the illustrated, vertically standing position, the hinge profile 41 comes to rest with the end of the band 45 in a corner of the corresponding chamber of the frame profile 23 and, by means of the straight area of the band 45, rests against a cheek of the corresponding groove 31'. In this condition, the plate 43, as the door, closes off the area of the board 22.

Figure 12:
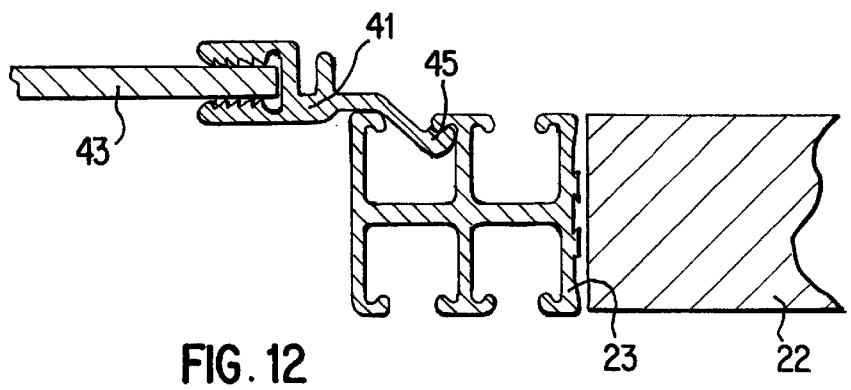
FIG. 12 is a cross-sectional view of FIG. 11 in a forward-folded state.

FIG. 12 represents the same cross-sectional view as FIG. 11, but this time with a forwardly folded-away hinge profile 41 and therefore the plate 43. In this position, the end of the band 45 comes in contact with the upper corner of the chamber of the frame profile 23 and thus holds the plate 43 in a horizontal opened position. By means of this hinge profile 41, a folding closure is advantageously created which has no additional bearing devices or hinge devices, in which case the space above the board 22 can also be fully utilized, without any reduction of the space by bearing devices or hinge devices.

Figure 13:
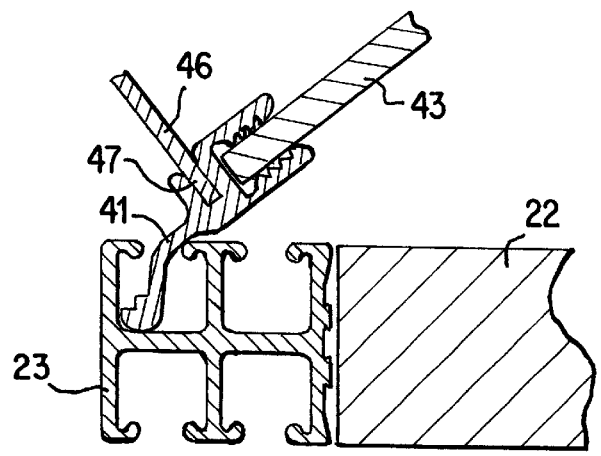
FIG. 13 is a cross-sectional view of FIG. 11 in a rearward-folded state.

Advantageously, this hinge profile 41 can also be used for implementing only a partial folding-out, preferably toward the inside, that is, toward the board side, as illustrated in FIG. 13. This can be used, for example, for presentation purposes, in that, in addition to the plate 43, a foot positioning device 46 is inserted into a groove 47 in the hinge profile 41 provided for this purpose.

Figure 14:
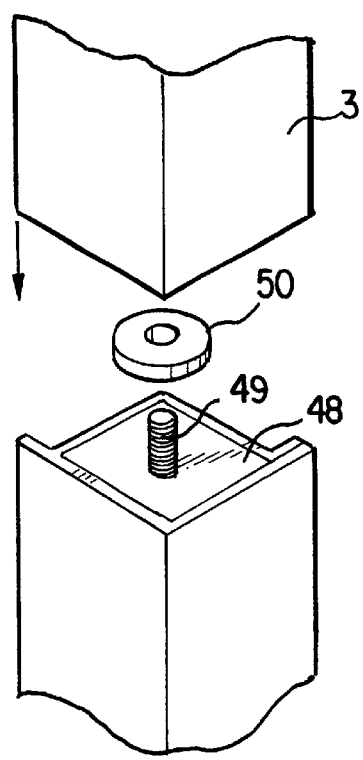
FIG. 14 is a view of two post elements which are to be connected with one another.
Figure 15:
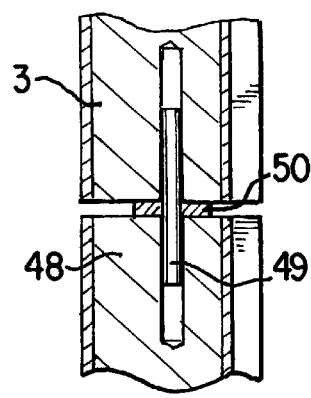
FIG. 15 is a longitudinal sectional view of two mutually connected post elements.

Advantageously, the set-up frames can also be expanded in that the post supporting profiles 3 can be supplemented by inserting additional post segments 48. For this purpose, studs 5 can also be inserted into the ends of the new post segment 48, and the two profiles, as illustrated in FIG. 14, are screwed together, for example, by means of a threaded bolt 49. For this purpose, the threaded bolt 49 is first screwed approximately half into the corresponding threaded bore of the stud 5 of a supporting profile 3 and is secured, for example, by gluing and is then screwed, by the rotation of the post segment 48, also into the corresponding threaded bore of this stud 5. Before the screwing-in, a ring 50 consisting of an elastic material is also placed by way of the threaded bolt 49, which ring comes to be situated between the end surfaces of the stud 5 of the post segment 48 and of the post 3. This ring 50 is now compressed between these two surfaces and advantageously causes the elimination of the backlash between the threaded bolt 49 and the threads of the studs 5; that is, the connection of the two posts 3 and 48 is virtually rigid, although the end faces do not come to rest precisely upon one another. This is necessary because the two posts 3 and 48 must be aligned with respect to one another and thus a precisely plane resting of these surfaces upon one another cannot be implemented.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. Set of structural elements for furniture, which contains connection elements, supporting profiles and covers, wherein the supporting profiles are straight rod-type hollow profiles which have a rectangular cross-section, which can be inserted into the supporting profiles and which have an essentially rectangular cross-section and have indentations which extend on at least two opposite sides respectively transversely to the insertion direction and are arranged in parallel to one another and can be connected in the corner area perpendicularly to the insertion direction with rectangular studs which also have a rectangular cross-section and indentations which extend on at least two opposite sides respectively transversely to the insertion direction and are arranged in parallel to one another and can also be inserted into the supporting profiles; and wherein at least some of the supporting profiles are frame and profiles having a web with two chambers on each of opposite sides of the web, each of said chambers having an opening in the form of a longitudinally extending continuous slot.

2. Set of structural elements according to claim 1, wherein the angular fittings in the corner area have a passage opening for a connection element which extends perpendicularly to the insertion direction.

3. Set of structural elements according to claim 2, wherein the two tips of the studs of the angular fittings have a trapezoidal shape.

4. A set of structural elements according to claim 2, wherein the connection element is a bore.

5. Set of structural elements according to claim 1, wherein the two tips of the studs of the angular fittings have a trapezoidal shape.

6. Set of structural elements according to claim 5, wherein the studs have respective longitudinally extending fastening element.

7. Set of structural elements according to claim 6, wherein the angular fittings and studs have positioning devices.

8. A set of structural elements according to claim 7, wherein the positioning devices of the angular fittings and studs are in the form of pins and bores.

9. Set of structural elements according to claim 7, wherein the openings of the frame profiles each have the same rectangular cross-section, and the edges of the slots are each reinforced by an interior bead extending in parallel to the slot opening.

10. Set of structural elements according to claim 9, wherein an elastic profile is provided which may be longitudinally slidably arranged in the openings of the frame profiles, has an essentially H-shaped cross-section, on both sides of the side walls forming two narrow grooves, outwardly projecting cheeks being arranged which laterally form one wide groove respectively.

11. Set of structural elements according to claim 10, wherein all four grooves of the elastic profile have a different width.

12. Set of structural elements according to claim 11, wherein the elastic profile consists of plastic and is constructed such that it can be inserted on edge as well as transversely into the openings of the frame profiles.

13. Set of structural elements according to claim 12, wherein hinge profiles are provided which have a basic body with a longitudinally extending groove and a bent band which projects from the opposite side of the groove opening, the free edge of the band being semicircularly rounded, and the band being slidable through a slot of the frame profile into the respective chamber.

14. Set of structural elements according to claim 13, wherein the groove of the hinge profile has tooth-type ribs on the interior surfaces.

15. Set of structural elements according to claim 13, wherein the frame profiles are fastened on edges of board elements and flat door elements are arranged in the elastic profiles.

16. A set of structural elements according to claim 6, wherein the longitudinally extending fastening elements of the studs are in the form of a threaded bore.

17. Set of structural elements according to claim 1, wherein the studs have respective longitudinally extending fastening elements.

18. A set of structural elements according to claim 17, wherein the longitudinally extending fastening elements of the studs are in the form of a threaded bore.

19. Set of structural elements according to claim 1, wherein the angular fittings and studs have positioning devices.

20. A set of structural elements according to claim 19, wherein the positioning devices of the angular fittings and studs are in the form of pins and bores.

21. Set of structural elements according to claim 1, wherein the openings of the frame profiles each have the same rectangular cross-section, and the edges of the slots are each reinforced by an interior bead extending in parallel to the slot opening.

22. Set of structural elements according to claim 1, wherein an elastic profile is provided which may be longitudinally slidably arranged in the openings of the frame profiles, has an essentially H-shaped cross-section, on both sides of the side walls forming two narrow grooves, outwardly projecting cheeks being arranged which laterally form one wide groove respectively.

23. Set of structural elements according to claim 22, wherein all four grooves of the elastic profile have a different width.

24. Set of structural elements according to claim 22, wherein the elastic profile consists of plastic and is constructed such that it can be longitudinally slidably inserted into the openings of the frame profiles.

25. Set of structural elements according to claim 1, wherein hinge profiles are provided which have a basic body with a longitudinally extending groove and a bent band which projects from the opposite side of the groove opening, the free edge of the band being semicircularly rounded, and the band being slidable through a slot of the frame profile into the respective chamber.

26. Set of structural elements according to claim 25, wherein the groove of the hinge profile has tooth-type ribs on the interior surfaces.

27. Shelves formed of structural elements according to claim 1, wherein the frame profiles are fastened on edges of board elements and flat door elements are arranged in the elastic profiles.

28. Set of structural elements for furniture, which contains connection elements, supporting profiles and covers, wherein the supporting profiles are straight rod-type hollow profiles which have a rectangular cross-section, which can be inserted into the supporting profiles and which have an essentially rectangular cross-section and have indentations which extend on at least two opposite sides respectively transversely to the insertion direction and are arranged in parallel to one another and can be connected in the corner area perpendicularly to the insertion direction with rectangular studs which also have a rectangular cross-section and indentations which extend on at least two opposite sides respectively transversely to the insertion direction and are arranged in parallel to one another and can also be inserted into the supporting profiles; and wherein an elastic profile is provided which may be longitudinally slidably arranged in the openings of the frame profiles, has an essentially H-shaped cross-section, on both sides of the side walls forming two narrow grooves, outwardly projecting cheeks being arranged which laterally form one wide groove respectively.

29. Set of structural elements according to claim 28, wherein all four grooves of the elastic profile have a different width.

30. Set of structural elements according to claim 28, wherein the elastic profile consists of plastic and is constructed such that it can be longitudinally slidably inserted into the openings of the frame profiles.

31. Set of structural elements for furniture, which contains connection elements, supporting profiles and covers, wherein the supporting profiles are straight rod-type hollow profiles which have a rectangular cross-section, which can be inserted into the supporting profiles and which have an essentially rectangular cross-section and have indentations which extend on at least two opposite sides respectively transversely to the insertion direction and are arranged in parallel to one another and can be connected in the corner area perpendicularly to the insertion direction with rectangular studs which also have a rectangular cross-section and indentations which extend on at least two opposite sides respectively transversely to the insertion direction and are arranged in parallel to one another and can also be inserted into the supporting profiles; and wherein hinge profiles are provided which have a basic body with a longitudinally extending groove and a bent band which projects from the opposite side of the groove opening, the free edge of the band being semicircularly rounded, and the band being slidable through a slot of the frame profile into the respective chamber.

32. Set of structural elements according to claim 31, wherein the groove of the hinge profile has tooth-type ribs on the interior surfaces.

33. Set of structural elements for furniture, which contains connection elements, supporting profiles and covers, wherein the supporting profiles are straight rod-type hollow profiles which have a rectangular cross-section, which can be inserted into the supporting profiles and which have an essentially rectangular cross-section and have indentations which extend on at least two opposite sides respectively transversely to the insertion direction and are arranged in parallel to one another and can be connected in the corner area perpendicularly to the insertion direction with rectangular studs which also have a rectangular cross-section and indentations which extend on at least two opposite sides respectively transversely to the insertion direction and are arranged in parallel to one another and can also be inserted into the supporting profiles; and wherein the frame profiles are fastened on edges of board elements and flat door elements are arranged in elastic profiles.

* * * * *